United States Patent [19]
Zapata et al.

[11] Patent Number: 5,107,619
[45] Date of Patent: Apr. 28, 1992

[54] ELECTRIC MOUSE TRAP

[76] Inventors: Alfredo Zapata, P.O. Box 99, Keyes, Calif. 95328; George Spector, 233 Broadway, Rm. 3815, New York, N.Y. 10007

[21] Appl. No.: 677,987

[22] Filed: Apr. 1, 1991

[51] Int. Cl.⁵ .................. A01M 23/10; A01M 23/30; A01M 23/00
[52] U.S. Cl. .......................... 43/81; 43/58; 43/75
[58] Field of Search ............... 43/81, 83.5, 75, 78, 43/98, 58

[56] References Cited

U.S. PATENT DOCUMENTS

| | | | |
|---|---|---|---|
| 1,175,797 | 3/1916 | Newell | 43/98 |
| 2,199,167 | 4/1940 | Brooks | 43/75 |
| 2,599,541 | 6/1952 | Burns | 43/75 |
| 3,633,348 | 2/1972 | Lusk | 43/75 |
| 4,349,980 | 9/1982 | McKee | 43/81 |
| 4,483,094 | 11/1984 | McKee | 43/75 |
| 4,719,718 | 1/1988 | Kon | 43/81 |
| 4,854,073 | 8/1989 | Ball | 43/75 |
| 4,890,415 | 1/1990 | Fressola | 43/58 |

FOREIGN PATENT DOCUMENTS

| | | | |
|---|---|---|---|
| 630906 | 10/1949 | United Kingdom | 43/81 |
| 8200568 | 3/1982 | World Int. Prop. O. | 43/75 |

Primary Examiner—Kurt Rowan

[57] ABSTRACT

An electric mouse trap is provided and consists of a solenoid powered by an electrical circuit mounted in a housing. The solenoid has a movable plunger pivotally connected to end of a trapping lever. An electric switch is carried on bottom of the housing under the trapping lever and is electrically connected to the circuit. A mouse entering an access opening in the housing will eat bait on the switch so that the switch will close activating the solenoid moving the trapping lever down onto the mouse.

5 Claims, 2 Drawing Sheets

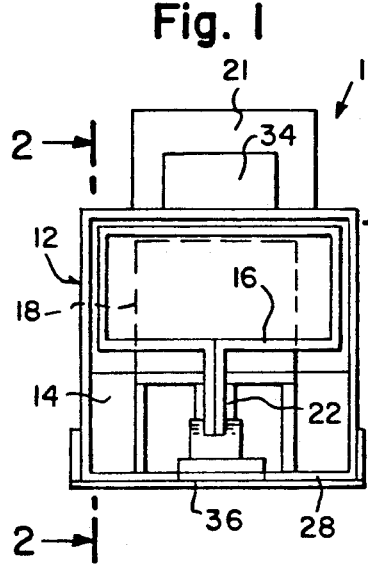
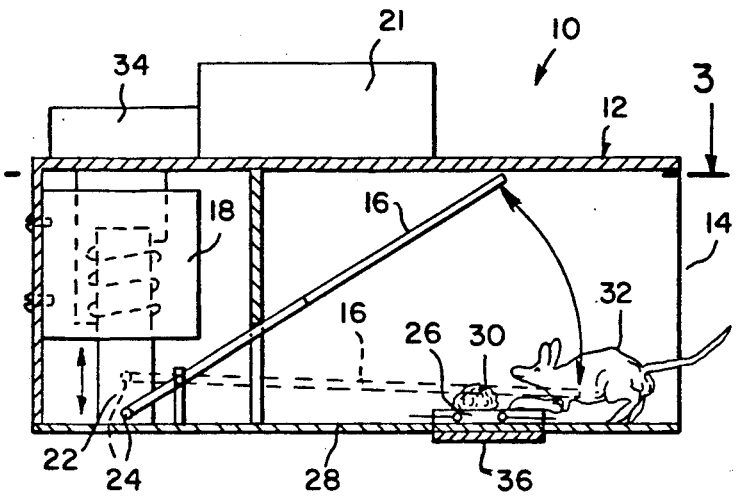
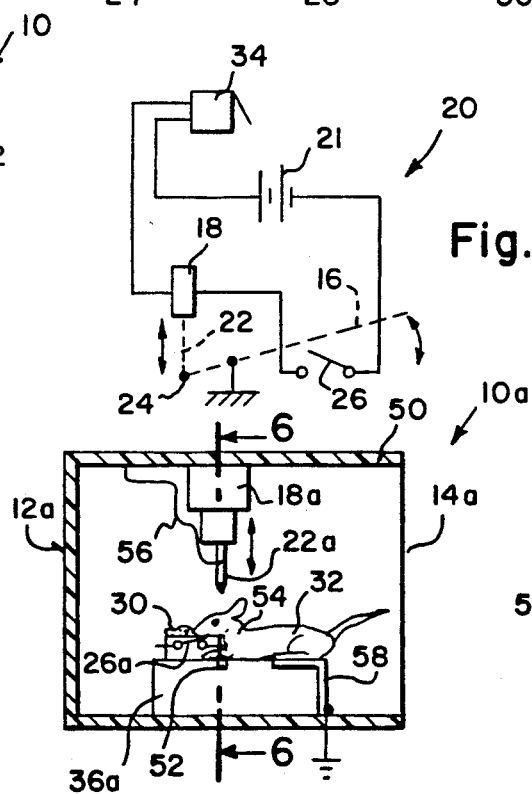
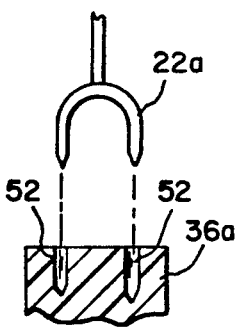

ELECTRIC MOUSE TRAP

BACKGROUND OF THE INVENTION

The instant invention relates generally to animal traps and more specifically it relates to an electric mouse trap.

Numerous animal traps have been provided in prior art that are adapted to kill rodents and the like by the use of electric and pneumatic actuators. For example, U.S. Pat. Nos. 3,638,348 to Lusk; U.S. Pat. No. 4,483,094 to McKee and U.S. Pat. No. 4,719,718 to Kon all are illustrative of such prior art. While these units may be suitable for the particular purpose to which they address, they would not be as suitable for the purposes of the present invention as heretofore described.

SUMMARY OF THE INVENTION

A primary object of the present invention is to provide an electric mouse trap that will overcome the shortcomings of the prior art devices.

Another object is to provide an electric mouse trap in which the trapping lever is operated by a solenoid activated from an electric switch in a removable baiting member.

An additional object is to provide an electric mouse trap in which the trapping lever is eliminated and the solenoid is directly positioned above the baiting member so that when the mouse activates the electric switch the plunger of the solenoid will capture and electrically kill the mouse.

A further object is to provide an electric mouse trap that is simple and easy to use.

A still further object is to provide an electric mouse trap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is an end view of the invention.

FIG. 2 is a side cross sectional view taken along line 2—2 in FIG. 1.

FIG. 3 is a top cross sectional view taken along line 3—3 in FIG. 2.

FIG. 4 is a schematic diagram of the electrical circuitry thereof.

FIG. 5 is a side cross sectional view of a modification in which the mouse activates a switch to operate a solenoid directly above so that the plunger will capture and electrically kill the mouse.

FIG. 6 is a partial cross sectional view taken along line 6—6 in FIG. 5, showing the Y-shaped plunger in greater detail.

DETAILED DESCRIPTION OF THE PREFERRED EMBODIMENTS

Figure 9:
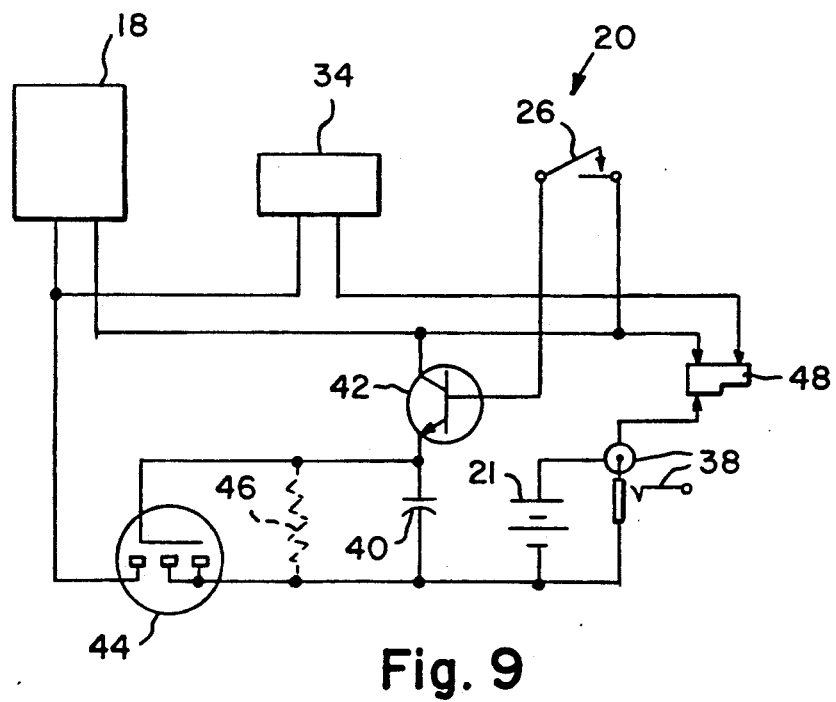
FIG. 9 is a schematic diagram of the electrical circuitry of FIG. 7.

Turning now descriptively to the drawings, in which similar reference characters denote similar elements throughout the several views, FIGS. 1, 2, 3 and 7 illustrate an electric mouse trap 10 consisting of a housing 12 having an access opening 14. A pivotable trapping lever 16 is mounted within the housing 12. A solenoid 18 is powered by an electrical circuit 20 with battery 21, as shown in FIGS. 4 and 9, mounted in the housing 12. The solenoid 16 has a movable plunger 22 pivotly connected at 24 to end of the trapping lever 16. An electric switch 26 is carried on bottom wall 28 of the housing 12 under the trapping lever 16 and is electrically connected to the circuit 20. The switch 26 can hold bait 30 thereon so that a mouse 32 entering the access opening 14 in the housing 12 will eat the bait 30 and close the switch 26 activating the solenoid 18 for moving the trapping lever 16 down onto the mouse 32.

Figure 7:
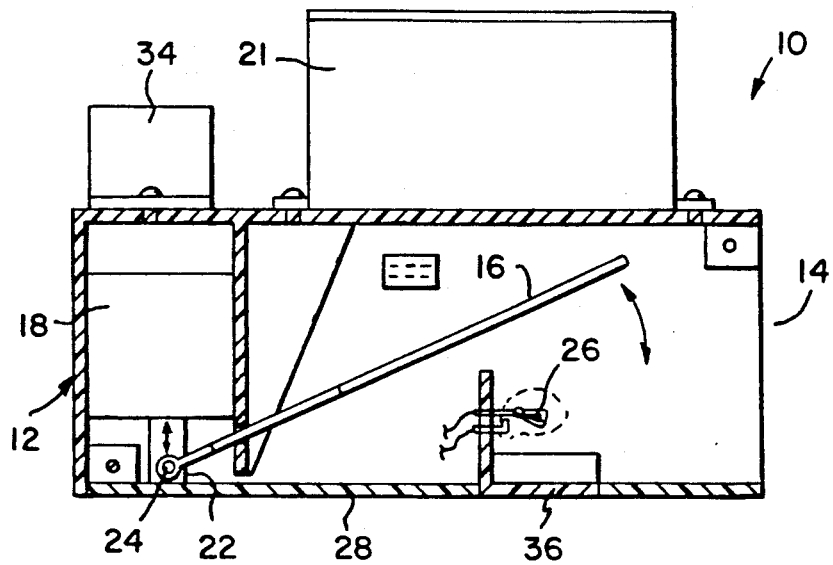
FIG. 7 is a side cross sectional view similar to FIG. 2, showing a variation in construction thereof.
Figure 8:
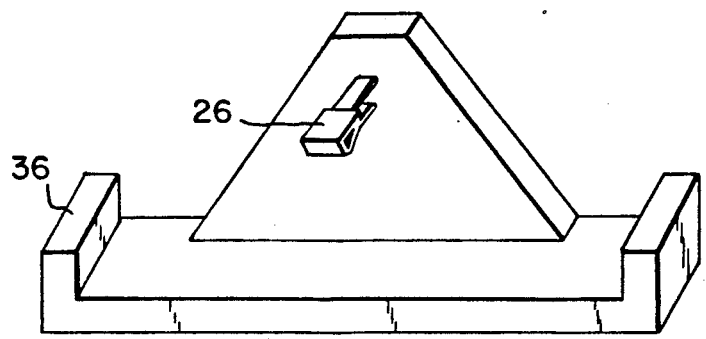
FIG. 8 is a perspective view of the removable base member in FIG. 7.

A buzzer 34 can be electrically connected to the circuit 20 so that when the trapping lever 16 comes down onto the mouse 32 the buzzer 34 will sound to indicate that the mouse 32 is trapped. A base member 36, see FIG. 8, is removably connected to the bottom wall 28 of the housing 12. The base member 36 holds the electrical switch 26 thereon so that after the mouse 32 is trapped the base member can be separated from the housing 12 to dispose of the mouse.

As shown in FIG. 9, the circuit 20 can also include an adapter power supply jack 38, a capacitor 40, an NPN transistor 42, a low voltage power transistor 44 and an optional resistor 46. A three position slide power switch 48 can also be in the circuit 20 in which in the first position the power is off, in the second position the power is on, the buzzer 34 off and in the third position the power is on and the buzzer 34 on.

FIG. 5 shows a modified electric mouse trap 10a consisting of a housing 12a having an access opening 14a. A solenoid 18a powered by the electrical circuit 20 is mounted to underside of top wall 50 of the housing 12a. The solenoid 18a has a Y-shaped movable plunger 22a. A base member 36a is disposed on bottom wall 28a of the housing 12a directly under the solenoid 18a. The base member 36a has two top apertures 52 therein, as best seen in FIG. 6. A switch 26a is carried on the base member 36a and is electrically connected to the circuit 20. The switch 26a can hold bait 30 thereon so that a mouse 32 entering the access opening 14a in the housing 12a will eat the bait 30 and close the switch 26a activating the solenoid 18a to move the Y-shaped plunger 22a down over the neck 54 of the mouse 32 into the apertures 52 in the base member 36a to trap the mouse.

A wire 56 is carried on the Y-shaped plunger 22a of the solenoid 18a and is electrically connected to the circuit 20. A grounded metal plate 58 is carried on the base member 36a so that when the Y-shaped plunger 22a comes down over the neck 54 of the mouse 32, the mouse will be electrocuted by grounding the circuit.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An electric mouse trap comprising:

a) a housing having an access opening;
b) a pivotable trapping lever mounted within said housing;
c) a solenoid powered by an electrical circuit mounted in said housing, said solenoid having a movable plunger pivotly connected to an end of said trapping lever; and
d) an electrical switch carried on bottom wall of said housing under said trapping lever and electrically connected to said circuit, said switch can hold bait thereon so that a mouse entering the access opening in said housing will eat the bait and close said switch activating said solenoid for moving said trapping lever down onto the mouse.

2. An electric mouse trap as recited in claim 1, further including a buzzer electrically connected to said circuit so that when said trapping lever comes down onto the mouse said buzzer will sound to indicate that the mouse is trapped.

3. An electric mouse trapped as recited in claim 2, further including a base member removably connected to the bottom wall of said housing, said base member holds said electrical switch thereon so that after the mouse is trapped said base member can be separated from said housing to dispose of the mouse.

4. An electric mouse trap comprising:
a) a housing having an access opening;
b) a solenoid powered by an electrical circuit and mounted to underside of top wall of said housing, said solenoid having a Y-shaped movable plunger;
c) a base member disposed on bottom wall of said housing directly under said solenoid, said base member having to top apertures therein; and
d) a switch carried on said base member, electrically connected to said circuit, said switch can hold bait thereon so that a mouse entering the access opening in said housing will eat the bait and close said switch activating said solenoid to move the Y-shaped plunger down over the neck of the mouse into the apertures in said base member to trap the mouse.

5. An electric mouse trap as recited in claim 4, further including:
a) a wire carried on the Y-shaped plunger of said solenoid and electrically connected to said circuit; and
b) a grounded metal plate carried on said base member so that when the Y-shaped plunger comes down over the neck of the mouse, the mouse will be electrocuted by grounding said circuit.

* * * * *